US009913164B2

(12) United States Patent
Rajagopalan et al.

(10) Patent No.: US 9,913,164 B2
(45) Date of Patent: Mar. 6, 2018

(54) METHODS, SYSTEMS, AND COMPUTER READABLE MEDIA FOR DYNAMICALLY CONFIGURING CUSTOMER PREMISES EQUIPMENT (CPE) IN A CONVERGED NETWORK (71) Applicant: Oracle International Corporation, Redwood Shores, CA (US)

(72) Inventors: Sundaram Rajagopalan, Waltham, MA (US); Ajay Padmakar Deo, Carrollton, TX (US)

(73) Assignee: Oracle International Corporation, Redwood Shores, CA (US)

( * ) Notice: Subject to any disclaimer, the term of this patent is extended or adjusted under 35 U.S.C. 154(b) by 224 days.

(21) Appl. No.: 13/948,106

(22) Filed: Jul. 22, 2013

(65) Prior Publication Data

US 2014/0029421 A1  Jan. 30, 2014

Related U.S. Application Data (60) Provisional application No. 61/674,268, filed on Jul. 20, 2012.

(51) Int. Cl.
*H04W 28/02* (2009.01)
*H04L 12/24* (2006.01)
*H04W 88/16* (2009.01)

(52) U.S. Cl.
CPC ..... *H04W 28/0268* (2013.01); *H04L 41/0806* (2013.01); *H04L 41/0816* (2013.01);
(Continued)

(58) Field of Classification Search
CPC .............. H04W 28/0268; H04W 88/16; H04L 41/0806; H04L 41/0816; H04L 41/5054; H04L 41/0893
See application file for complete search history.

(56) References Cited

U.S. PATENT DOCUMENTS 7,522,904 B1    4/2009 Zhu
8,325,674 B2 *  12/2012 Livanos ................. H04L 47/14
                                                    370/328
(Continued)

FOREIGN PATENT DOCUMENTS

CN    101073286 A    11/2007
CN    102340792 A    2/2012
(Continued)

OTHER PUBLICATIONS

Communication of European Publication Number and Information on the Application of Article 67(3) EPC for European Patent Application No. 13820271.8 (Apr. 30, 2015).
(Continued)

*Primary Examiner* — Gregory Sefcheck
*Assistant Examiner* — Joshua Smith
(74) *Attorney, Agent, or Firm* — Jenkins, Wilson, Taylor & Hunt, P.A.

(57) ABSTRACT

Methods, systems, and computer readable media for dynamically configuring customer premises equipment (CPE) in a converged network are disclosed. According to one aspect, the subject matter described herein comprises a method performed at a mobility offload gateway that includes receiving cell site change notification message from a mobile network, determining, based on the change notification message, whether user equipment (UE) can be offloaded to a Wi-Fi network, and in response to determining that the UE can be offloaded, dynamically configuring consumer premises equipment (CPE) associated with the identified Wi-Fi network to support a predetermined quality of service (QoS) for the UE.

13 Claims, 4 Drawing Sheets (52) U.S. Cl.
CPC ...... *H04L 41/0893* (2013.01); *H04L 41/5054* (2013.01); *H04W 88/16* (2013.01)

(56) References Cited

U.S. PATENT DOCUMENTS

| | | | |
|---|---|---|---|
| 2003/0110290 | A1 | 6/2003 | Hiyama et al. |
| 2005/0014509 | A1* | 1/2005 | Semper ................ H04W 28/24 455/452.2 |
| 2005/0227694 | A1 | 10/2005 | Hayashi |
| 2006/0025149 | A1* | 2/2006 | Karaoguz et al. ......... 455/452.2 |
| 2006/0240828 | A1* | 10/2006 | Jain et al. ..................... 455/436 |
| 2008/0137626 | A1 | 6/2008 | Choi et al. |
| 2009/0040983 | A1* | 2/2009 | Kim ...................... H04W 28/24 370/331 |
| 2009/0103454 | A1 | 4/2009 | Watanabe et al. |
| 2009/0219890 | A1* | 9/2009 | Zhang ...................... H04W 8/20 370/331 |
| 2010/0037284 | A1* | 2/2010 | Sachs ............................ 370/328 |
| 2010/0056157 | A1* | 3/2010 | Verona et al. ................ 455/438 |
| 2010/0113033 | A1* | 5/2010 | Qiu .................... H04W 36/0055 455/438 |
| 2010/0240385 | A1* | 9/2010 | Lohr ................ H04W 36/0072 455/452.2 |
| 2011/0038364 | A1* | 2/2011 | Monsieux .............. H04Q 11/04 370/352 |
| 2011/0201336 | A1* | 8/2011 | Garrett et al. ................ 455/436 |
| 2011/0230201 | A1 | 9/2011 | Hotes et al. |
| 2011/0286437 | A1 | 11/2011 | Austin et al. |
| 2011/0317663 | A1* | 12/2011 | Choi et al. .................... 370/331 |
| 2011/0320588 | A1 | 12/2011 | Raleigh |
| 2012/0008578 | A1 | 1/2012 | Kant et al. |
| 2012/0089699 | A1* | 4/2012 | Cholas ................ H04L 12/2812 709/217 |
| 2013/0077482 | A1 | 3/2013 | Krishna et al. |
| 2013/0155849 | A1* | 6/2013 | Koodli et al. ................ 370/230 |
| 2013/0244654 | A1* | 9/2013 | Carmon et al. .............. 455/436 |
| 2014/0003297 | A1 | 1/2014 | Uusitalo et al. |
| 2014/0100962 | A1 | 4/2014 | Rajagopalan et al. |

FOREIGN PATENT DOCUMENTS

| | | |
|---|---|---|
| EP | 1 638 261 A1 | 3/2006 |
| EP | 2 875 696 B1 | 10/2016 |
| JP | 2008-187467 A | 8/2008 |
| WO | WO 2005/041527 A1 | 5/2005 |
| WO | WO 2010/025022 A1 | 3/2010 |
| WO | WO 2011/035443 A1 | 3/2011 |
| WO | WO 2012/047912 A2 | 4/2012 |

OTHER PUBLICATIONS

Final Office Action for U.S. Appl. No. 14/051,119 (Apr. 24, 2015).
Non-Final Office Action for U.S. Appl. No. 14/051,119 (Dec. 5, 2014).
Commonly-assigned, co-pending U.S. Appl. No. 14/051,119 for "Methods, Systems, and Computer Readable Media for Ad-Supported Wireless Offloading," (Unpublished, filed Oct. 10, 2013).
Notification of Transmittal of the International Search Report and the Written Opinion of the International Searching Authority, or the Declaration for International Application No. PCT/US2013/051527 (Aug. 27, 2013).
Advisory Action for U.S. Appl. No. 14/051,119 (Jul. 30, 2015).
Communication under Rule 71(3) EPC for European Patent Application No. 13 320 271.8 (Jun. 29, 2016).
Applicant-Initiated Interview Summary for U.S. Appl. No. 14/051,119 (Jun. 17, 2016).
Non-Final Office Action for U.S. Appl. No. 14/051,119 (Feb. 29, 2016).
Extended European Search Report for European Application No. 13820271.8 (Jan. 5, 2016).
Decision to grant a European patent pursuant to Article 97(1) EPC for European Patent Application No. 13820271.8 (Sep. 8, 2016).
Advisory Action for U.S. Appl. No. 14/051,119 (Dec. 1, 2016).
Final Office Action for U.S. Appl. No. 14/051,119 (Sep. 9, 2016).
Non-Final Office Action for U.S. Appl. No. 14/051,119 (dated Jul. 11, 2017).
Notification of the First Office Action for Chinese Patent Application No. 201380038254.6 (dated Jun. 13, 2017).
Letter Regarding Office Action for Japanese Patent Application No. 2015-523305 (dated May 9, 2017).

* cited by examiner

METHODS, SYSTEMS, AND COMPUTER READABLE MEDIA FOR DYNAMICALLY CONFIGURING CUSTOMER PREMISES EQUIPMENT (CPE) IN A CONVERGED NETWORK

PRIORITY CLAIM

This application claims the benefit of U.S. Provisional Patent Application No. 61/674,268, filed on Jul. 20, 2012, the disclosure of which is incorporated herein by reference in its entirety.

TECHNICAL FIELD

The subject matter described herein relates to dynamic configuration of network components. More particularly, the subject matter described herein relates to methods, systems, and computer readable media for dynamically configuring customer premises equipment (CPE) in a converged network.

BACKGROUND

When accessing network services via different access networks, it is desirable to maintain the same quality of service (QoS) when changing from one network type to another network type. For example, when a mobile device user is at home and watching a movie on a mobile device (e.g., an iPad tablet) and the movie is being streamed over the user's home Wi-Fi network, the customer premises equipment (CPE) that facilitates the Wi-Fi network is configured to provide a particular quality of service for the streaming movie content. For example, the quality of service may include bandwidth and delay parameters that ensure that the movie is streamed appropriately. When the mobile device user leaves the Wi-Fi network (for example, by going outside and leaving the Wi-Fi range) and wishes to continue watching the same movie, it is desirable to release the resources associated with the Wi-Fi network as well as to provision elements in the mobile network to provide the same quality of service. If the user visits a friend's house and wants to continue watching the same movie on the mobile device, it may be desirable to configure the customer premises equipment at the friend's house to provide the same quality of service level.

Notably, fixed CPE equipment (e.g., such as a residential gateway that provides Internet service to residential subscribers) do not have subscriber level visibility. Thus, all of the flows communicated from the customer premises equipment to the local Wi-Fi network are treated the same without distinction. Accordingly, preferential treatment or application of quality of service by the service provider may not be possible using existing CPE equipment when a user is offloaded to a network supported by a CPE.

Thus, there exists a need for methods, systems, and computer readable media for dynamically configuring customer premises equipment in a converged network.

SUMMARY

Methods, systems, and computer readable media for dynamically configuring customer premises equipment (CPE) in a converged network are disclosed. According to one aspect, the subject matter described herein comprises a method performed at a mobility offload gateway that includes receiving cell site change notification message from a mobile network, determining, based on the change notification message, whether user equipment (UE) can be offloaded to a Wi-Fi network, and in response to determining that the UE can be offloaded, dynamically configuring consumer premises equipment (CPE) associated with the identified Wi-Fi network to support a predetermined quality of service (QoS) for the UE.

In an alternate embodiment, a method for dynamic CPE configuration includes steps performed at a mobility offload gateway. The method includes receiving, at the mobility offload gateway, a cell site change notification regarding a mobile device having an existing flow provided by a first network. The method further includes, determining, at the mobility offload gateway, and based on the cell site change notification, whether the flow for the UE can be offloaded to a Wi-Fi network. In response to determining that the flow for the UE can be offloaded, dynamically configuring CPE associated with the Wi-Fi network to support QoS for the flow.

The subject matter described herein for dynamically configuring customer premises equipment in a converged network may be implemented in hardware, software, firmware, or any combination thereof. As such, the terms "function", "module", or "node" as used herein refer to hardware, which may also include software and/or firmware components, for implementing the feature being described. In one exemplary implementation, the subject matter described herein may be implemented using a computer readable medium having stored thereon computer executable instructions that when executed by a hardware based processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

Figure 1:
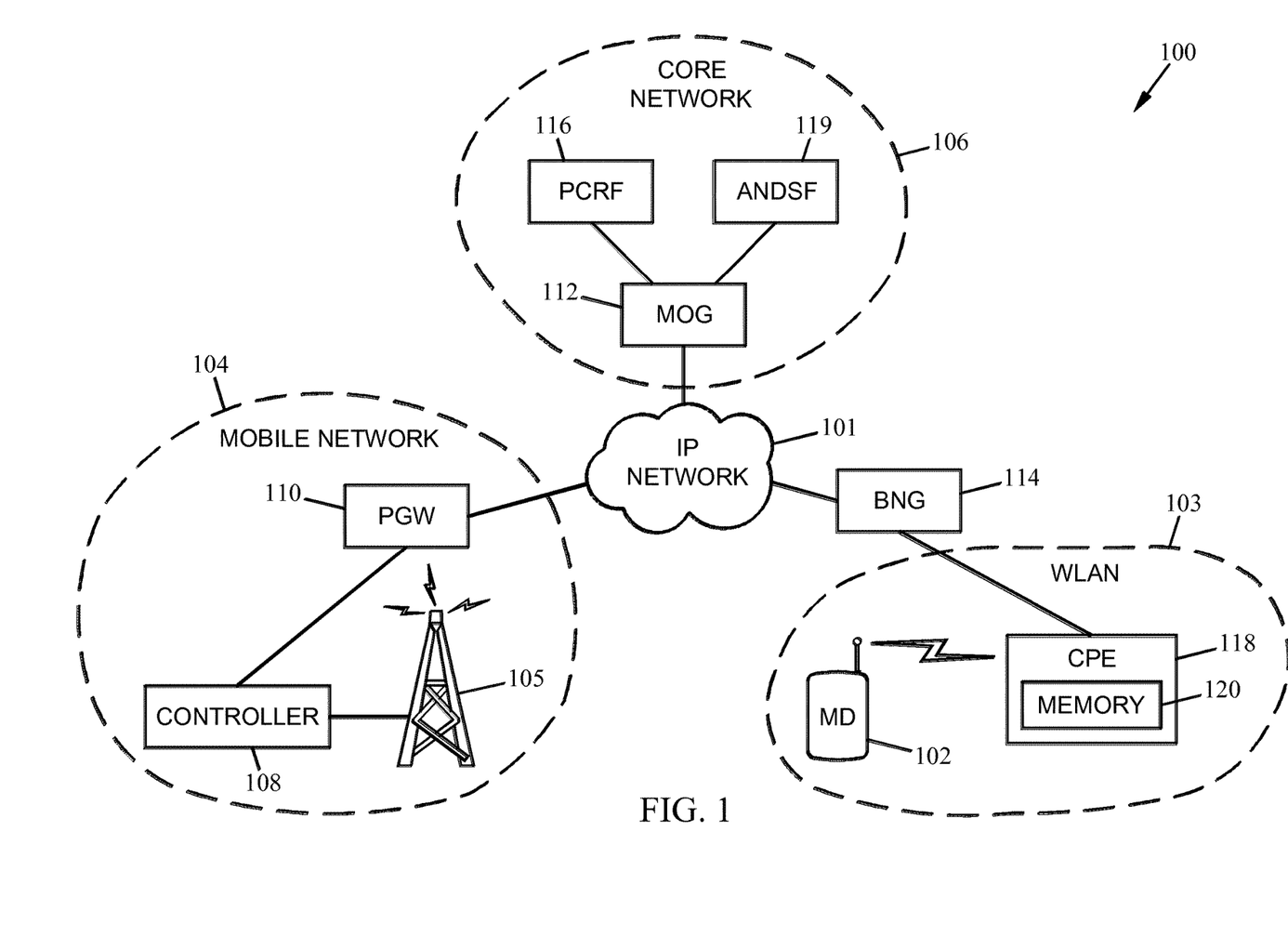
FIG. 1 is block diagram illustrating an exemplary system for dynamically configuring customer premises equipment in a converged network according to an embodiment of the subject matter described herein.

FIG. 1 is block diagram illustrating an exemplary system for dynamically configuring customer premises equipment in a converged network according to an embodiment of the subject matter described herein. Specifically, FIG. 1 depicts an exemplary system 100 that includes a user equipment (UE) device 102, a mobile network 104 (e.g., "mobile/ cellular access network" or "radio access network"), a wireless local area network (WLAN) 103, and a core data content network 106 (e.g., "core network") that are communicatively connected. In some embodiments, networks 103, 104, and 106 may be communicatively connected to an Internet protocol (IP) network 101 (e.g., the Internet).

In some embodiments, UE 102 may include a mobile handset, a mobile smart phone, a tablet computer, or any other mobile device that is capable of being moved between networks of different types and capable of attaching to and receiving data via networks of different types. For example, UE 102 may be an iPad or iPhone through which the user receives video download service. Although not shown, UE 102 may include a hardware based processor and a memory component configured to store quality of service parameters and/or settings provided by MOG 112.

In one embodiment, WLAN 103 may include any fixed wireless network that utilizes a customer premise equipment (CPE) 118 to provide user equipment with wireless access to IP network 101 via a broadband network gateway (BNG) 114. Examples of a WLAN include, but are not limited to, a Wi-Fi network and a WiMax network. Customer premises equipment (CPE) 118 may be a residential gateway that provides access to Internet service to fixed and mobile devices within a user's residence and/or local area network. CPE 118 may also be a similar type of gateway that provides network connection services within a user's business. For example, CPE 118 may include a residential gateway, such as a wireless router, a cable modem, a DSL modem, a wireless access point, and the like. In one embodiment, CPE 118 may include a hardware based processor 121 and a memory component 120 configured to store quality of service policy parameters 124 and/or settings provided by MOG 112.

In some embodiments, mobile network 104 may comprise any type of mobile or cellular based network that is configured for providing UE 102 (when UE 102 is located within network 104) access to IP network 101 and/or core network 106. Examples of a mobile network may include a 3GPP radio access network (RAN), a 3G RAN, a 4G RAN, a long term evolution (LTE) network, or the like. Although FIG. 1 depicts UE 102 as being located within WLAN 103, UE 102 may be moved to and served by mobile network 104 (or a similar cell or mobile network not shown in FIG. 1). For example, a wireless air link may be established between a cell tower 105 and UE 102, in the even UE 102 enters or is activated within mobile network 104. Notably, all communications (e.g., signaling path and bearer/data content path) made between UE 102 and mobile network 104 (when UE 102 is located in network 104) is conducted via the air link (e.g., a radio connection).

In some embodiments, mobile network 104 may include a controller unit 108 (e.g., a base station controller (BSC), a radio network controller, a Node B, or an evolved Node B (eNode B)) that is attached or incorporated within a base station or cell tower (e.g., cell tower 105). Controller unit 108 may also be connected to a packet gateway (PGW) 110, which may include any network element that connects with IP network 101 and provides data service to subscribers present in the mobile network 104. In one embodiment, PGW 110 may be an LTE network component that provides packet data services to UEs that are not in range of a Wi-Fi network and/or are not utilizing an in-range Wi-Fi network. PGW 110 may also be configured to communicatively connect mobile network 104 to core network 106 via IP network 101. In some embodiments, PGW 110 may include a policy control and enforcement function (PCEF) that communicates with PCRF node 116.

Core network 106 (e.g., a core data content network) is a network operated by a service provider/operator and may include a mobility offload gateway (MOG) 112, a policy and charging rules function (PCRF) node 116, an access network discovery and selection function (ANDSF) node 119, and one or more content servers 122. Content servers 122 may be any server located in core network 106 that is configured to provide data to an accessing UE 102 either via mobile network 104 or WLAN 103. Exemplary content servers found in core network 106 may include video on demand (VOD) servers, audio on demand servers, audio and video on demand (AVOD) servers, Internet protocol television (IPTV) servers, and the like.

In one embodiment, MOG 112 may be part of the network policy infrastructure that instructs other nodes in the network on policies to implement for sessions involving UEs and/or CPEs. MOG 112 may also be a standalone node, such as a mobile policy gateway (MPG), that is part of the policy infrastructure and is configured to manage i) a UE's QoS offload process from a mobile network to a WLAN (e.g., from mobile network 104 to WLAN 103) and ii) a UE's onload process from a WLAN to a mobile network (e.g., from WLAN 103 to mobile network 104).

In some embodiments, MOG 112 is further configured to connect to a policy server, such as PCRF node 116, in core network 106. PCRF node 116 may be any network element that is configured to store network policies and respond to queries from other nodes to provide such policies. In some embodiments, MOG 112 and PCRF node 116 may either be integrated together in a single node or distributed among a plurality of nodes in core network 106. In one embodiment, PCRF node 116 may be configured to store network policy rules (or "policies") and to respond to queries from other nodes to provide such policy rules. For example, PCRF node 116 may receive a query from MOG 112 requesting at least one policy rule. In one embodiment, the policy rules obtained from PCRF node 116 (instead of ANDSF node 119) may include QoS parameters or settings that can be subsequently applied to a CPE that services a user's UE in a WLAN. MOG 112 may store the policy rules provided by PCRF node 116 in a database or in memory (not shown). PCRF node 116 may also be configured to send cell site change notification messages to MOG 112 in the even UE 102 relocates to and/or from a cell in the mobile network. As used herein, a cell site change notification message may indicate that i) a UE relocates from a first cell to a second cell, ii) a UE relocates from a cell to a WLAN, and iii) a UE relocates from a WLAN to a cell.

In some embodiments, MOG 112 may also be configured to inform UE 102 of local WLAN and/or Wi-Fi networks (e.g., an existing Wi-Fi network provided to public users, such as at an airport, store, restaurant, or the like) that are accessible and/or secure to UE 102. For example, after receiving detected network information (e.g., data indicating recent cell sites and/or detected WLANs) from UE 102, MOG 112 may be configured to determine the different Wi-Fi networks detected by UE 102 that are designated as secure and/or trustworthy. In one embodiment, MOG 112 may accomplish this by querying ANDSF node 119. In one embodiment, MOG 112 may be connected (or integrated) with ANDSF node 119, which is responsible for helping UE 102 discover non-3GPP access networks (e.g., WLANs such as Wi-Fi or WiMax access networks). ANDSF node 119 may also be configured to provide policy rules regarding access network connection to UE 102. For example, the policy rules obtained from ANDSF node 119 may include QoS parameters or settings that can be subsequently applied to a CPE that services a user's UE in a WLAN. In some embodiments, MOG 112 may also be configured to provide UE 102 with secure credentials (obtained from ANDSF node 119) to connect to a local Wi-Fi network. MOG 112 may store the policy rules provided by ANDSF node 119 in a database or in memory (not shown). Internal components of MOG 112 are discussed in further detail below with regard to the description of FIG. 3.

Figure 2A:
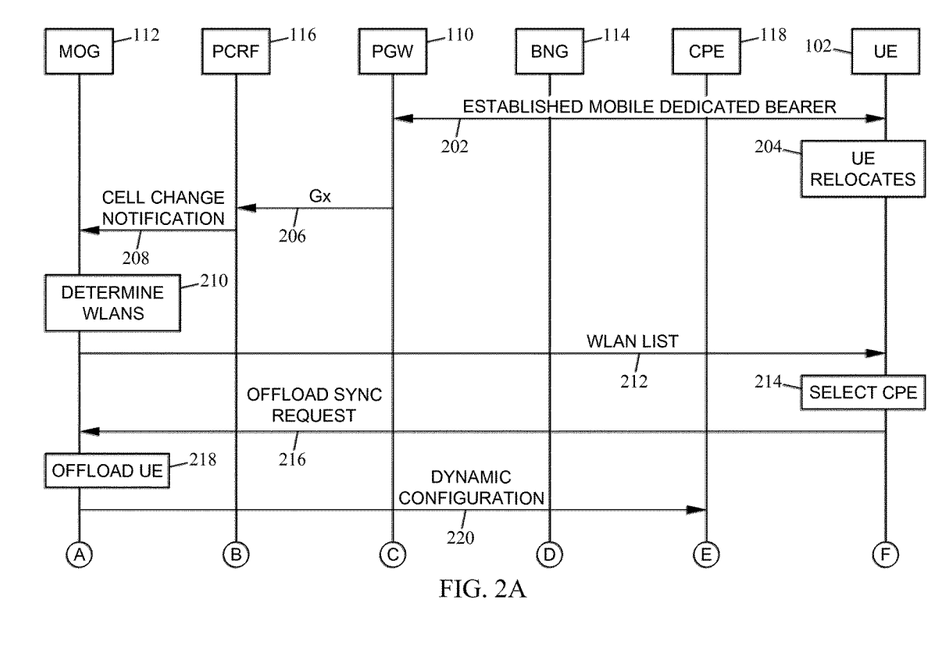
FIGS. 2A and 2B are message flow diagrams illustrating exemplary messaging for dynamically configuring customer premises equipment to implement quality of service for a session involving a mobile device according to an embodiment of the subject matter described herein.
Figure 2B:
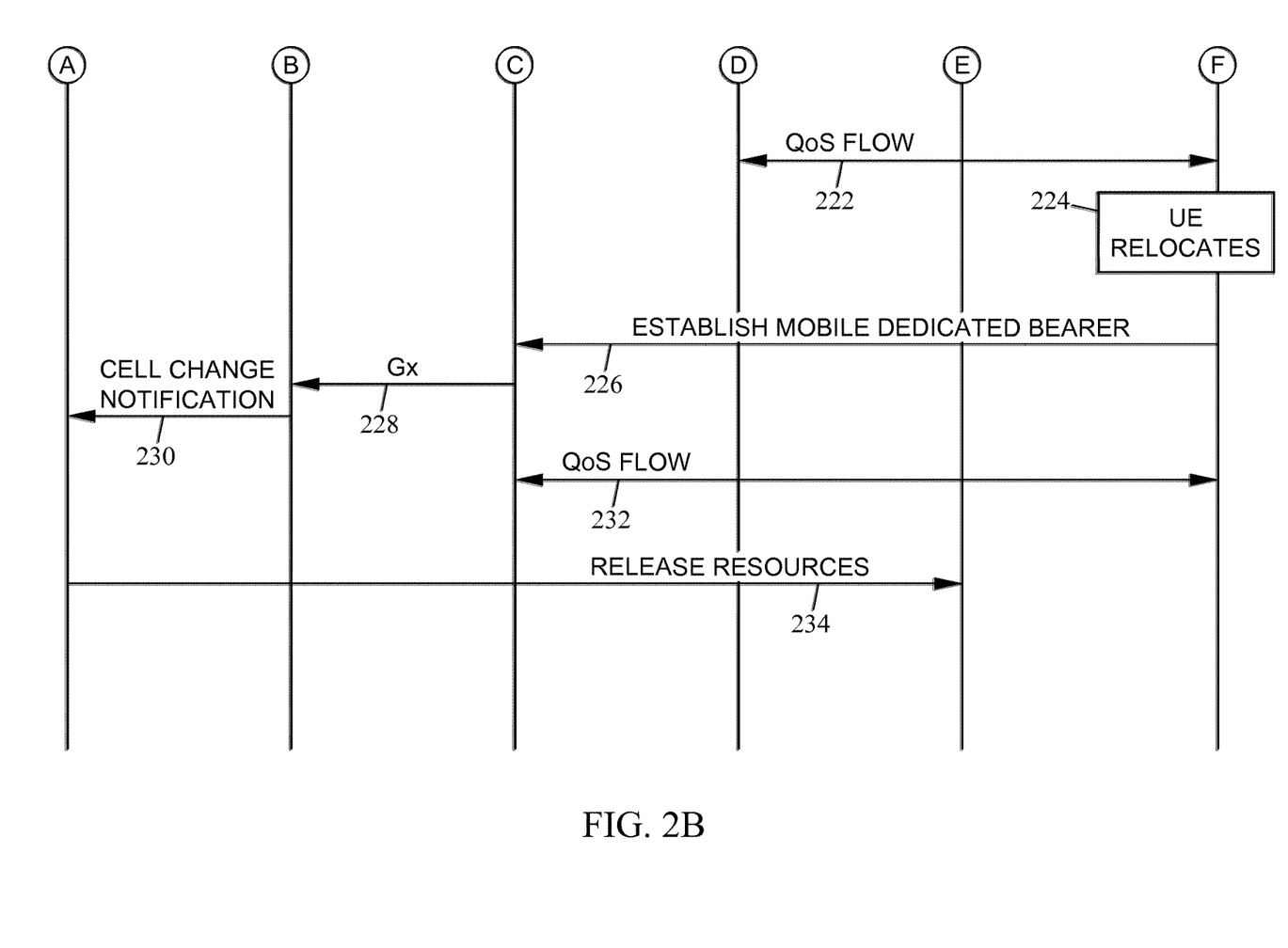

FIGS. 2A and 2B are message flow diagrams illustrating exemplary signaling messaging for dynamically configuring customer premises equipment to implement quality of service for a session flow involving a mobile device. As used herein, a session flow may include the communication of packets associated with a voice over IP (VoIP) call, a video call, a video streaming session, or the like. Although not shown, the session flow may include media content provided to UE 102 from content server 122 shown in FIG. 1. At shown in signaling 202, a mobile dedicated bearer path is currently established for the session flow between UE 102 and PGW 110. Notably, the established session flow is being communicated in accordance to a particular QoS level. At block 204, UE 102 relocates from a mobile network (e.g., a LTE network) to a WLAN (e.g., Wi-Fi) network while receiving QoS for the session flow. For example, the established mobile dedicated bearer 202 may be utilized by UE 102 to display a streaming movie provided by a content server in core network 106 at 10 megabytes per second of download bandwidth at the time when UE 102 leaves network 104 and/or enters an area corresponding to a different network (e.g., a Wi-Fi network).

At this time, PGW 110 may be notified of the relocation of UE 102 and may establish a Gx session (see message 206) with PCRF 116 to determine whether the new network can be used to provide the same quality of service for the communicated flow. As used herein, the Gx session may be conducted via a Diameter based Gx interface between PGW 110 and PCRF 116. In one embodiment, the UE 102 in mobile network 104 may send a update location message to controller 108 which in turn forwards the information to PGW 110. PGW 110 may then issue a cell site change notification message to PCRF 116 (either directly or through MOG 112) via the Gx session 206. In response, PCRF 116 may send a cell site change notification message 208 to MOG 112. In one embodiment, message 208 may be originated in the mobile network 104 and is forwarded by PCRF 116 to MOG 112.

After receiving message 208, MOG 112 may determine whether UE 102 can be offloaded. For example, MOG 112 may determine whether i) at least one nearby and/or local Wi-Fi network may be securely accessed by UE 102 and ii) whether any of the nearby Wi-Fi networks can provide the appropriate (e.g., previously provided and predetermined) quality of service level. Afterwards, MOG 112 may send a message 212 providing UE 102 with a list of possible WLANs that UE 102 may be authorized to securely access and that may provide the requested quality of service. In one embodiment, MOG 112 may provide UE 102 with authorization credentials to access the listed WLANs in a secure manner.

Upon receiving message 212, UE 102 may be configured to access a preferred list of WLANs and Wi-Fi networks stored in a local memory. The preferred list may identify each separate WLAN by the IP address of the CPE located in each respective WLAN. After UE 102 cross-references the IP addresses in preferred list with the WLAN list entries provided in message 212 to select a WLAN and/or CPE (see block 214), UE 102 sends an offload synchronization request message 216 (i.e., a "sync request") to MOG 112. Notably, request message 216 includes the IP address of the selected CPE.

After MOG 112 and UE 102 exchange offload synchronization messaging that indicates the IP address of CPE 118, MOG 112 initiates the process to offload UE 102 from network 104 to WLAN 103 (i.e., the selected WLAN). For example, MOG 112 may send a dynamic configuration message 220 in order to configure CPE 118. Notably, configuration message 220 includes QoS parameters or policy rules that can be used to configure CPE 118 to provide a desired and/or predetermined QoS level. Such QoS policy rules provisioned on CPE 118 may be stored in memory 120 (as QoS policy parameters or rules 124). In some embodiments, QoS parameters 124 may include specific rules or policies that indicate the manner in which the subscribers and/or UEs are to be served by CPE 118. For example, exemplary subscriber-specific or UE-specific policy rules include bandwidth usage rules, device specific or subscriber specific priority access rules, tier-based subscription policy rules, total data quota policy rules, and the like.

In one embodiment, MOG 112 dynamically configures CPE 118 by sending Broadband Forum (BBF) TR-69 commands to instruct CPE 118 to accommodate the current bandwidth requirements of UE 102 by implementing the predetermined QoS for the session flow. In an alternate embodiment, MOG 112 may configure CPE 118 by sending one or more propriety commands instead of sending TR-69 commands. CPE 118 may then respond to the received command(s) by providing the requested QoS to UE 102. Thus, UE 102 is able to establish a session flow 222 that is directed to BNG 114 in accordance to the predetermined QoS.

At some later time, UE 102 may relocate by leaving the local WLAN and enter a mobile network cell that is able to provide service to UE 102 (see block 224). For example, UE 102 may leave WLAN network 103 and move back to mobile network 104. Upon entering mobile network 104, UE 102 re-attaches to the mobile network via the wireless infrastructure and UE 102 or controller 108 informs MOG 112 of the UE's new location (e.g., new cell site). In one embodiment, UE 102 communicates with PGW 110 to establish a mobile dedicated bearer (see signaling 226). At this time, PGW 110 may establish a Gx session (see message 228) with PCRF 116 to determine whether the new mobile network (e.g., a new mobile network or re-entered mobile network 104) can be used to provide the same quality of service for the communicated session flow. In response, PCRF 116 may send a cell site change notification message 230 to MOG 112.

After UE 102 establishes a mobile dedicated bearer for the session flow (e.g., dedicated bearer 226) in accordance with the predetermined QoS, UE 102 may begin communicating packets associated with the session flow flow with PGW 110 (see signaling 232).

In one embodiment, MOG 112 sends a message 234 to CPE 118 to lift the dynamically configured QoS from CPE 118. For example, message 234 may indicate the release of the resources associated with providing the QoS to UE 102. In one embodiment, MOG 112 dynamically configures CPE 118 by sending BBF TR-69 commands to instruct CPE 118 to release the resources previously used to accommodate the streaming requirements of UE 102 to implement the predetermined QoS for the session flow in previously utilized WLAN 103. In one embodiment, the session flow may include a VOD session flow conducted between content server 122 and UE 102. In an alternate embodiment, MOG 112 may instruct CPE 118 to remove the QoS by sending one or more propriety commands instead of TR-69 commands. CPE 118 may then respond to the received command by releasing the resources previously utilized to provide the QoS to UE 102.

Thus, in the example illustrated in FIGS. 2A and 2B, MOG 112, which is part of the network policy infrastructure, performs the functions necessary to dynamically configure customer premise equipment to implement a required QoS for a flow.

Figure 3:
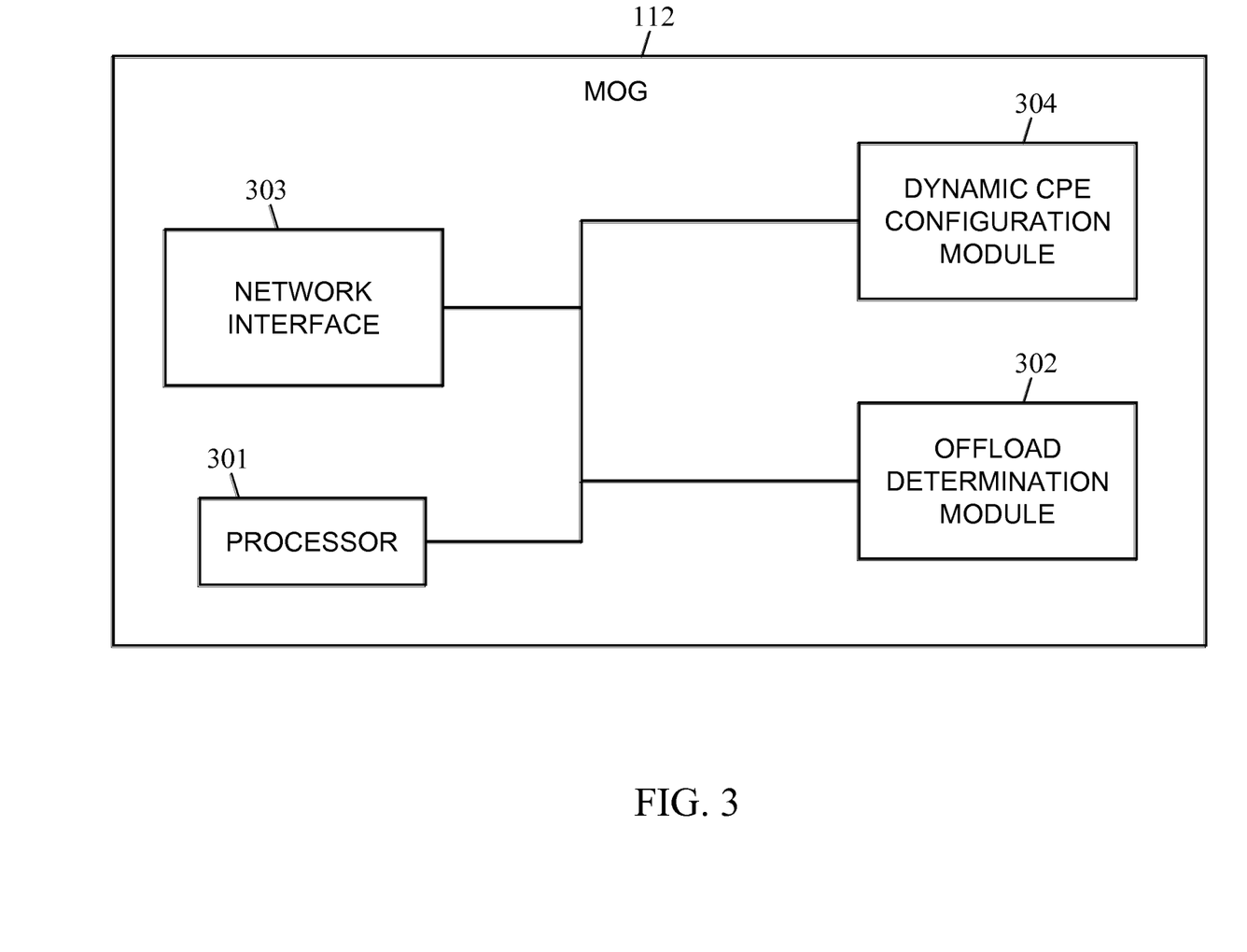
FIG. 3 is a block diagram illustrating a mobility offload gateway according to an embodiment of the subject matter described herein.

FIG. 3 is a block diagram of a mobility offload gateway according to an embodiment of the subject matter described herein. Referring to FIG. 3, mobility offload gateway 112 includes a processor 301, an offload determination module 302, a network interface 303, and a dynamic CPE configuration module 304. Processor 301 may include any hardware based processor that can be configured to execute modules 302 and 304 to perform the aforementioned offloading and onloading processes. As used herein, offloading includes the transfer of a session flow associated with a predetermined QoS from a mobile based access network to a WLAN (or Wi-Fi) based access network, such that the QoS of the session flow between the UE and the core network is maintained or does not degrade. Similarly, as used herein, onloading includes the transfer of a session flow associated with a predetermined QoS from WLAN (or Wi-Fi) based access network to a mobile based access network, such that the QoS of the session flow between the UE and the core network is at least maintained or does not degrade.

In some embodiments, network interface 303 may be configured for receiving a cell site change notification message from a mobile network. Interface 303 may also include a Diameter interface for communicating with a PCRF node. Alternatively, network interface 303 may include a Diameter interface for communicating with a mobility management entity (MME) if MOG 112 is a component of a PCRF.

In some embodiments, offload determination module 302 may be configured for determining (based on the cell site change notification) whether user equipment can be offloaded to a Wi-Fi network. For example, module 302 may be used to communicate with an ANDSF node to obtain offload information.

In some embodiments, MOG 112 further includes a dynamic customer premises configuration module 304 configured for dynamically configuring CPE equipment associated with the identified Wi-Fi network to support a predetermined quality of service for the UE (in response to determining that the UE can be offloaded). For example, dynamic CPE configuration module 204 may configure a residential gateway associated within a Wi-Fi network to provide a specified or predetermined quality of service for a UE that the UE previously utilized in an LTE network.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for dynamic customer premises equipment configuration, the method comprising:
at a mobility offload gateway:
receiving a cell site change notification message from a cellular mobile network, the cell site change notification message specifying that user equipment (UE) has relocated from the cellular mobile network;
determining, based on the cell site change notification message, that the UE can be offloaded to a Wi-Fi network, including determining that the Wi-Fi network is configured for supporting a quality of service (QoS) level for a session flow of the UE established by the UE on the cellular mobile network;
in response to receiving the cell site change notification message and determining that the UE can be offloaded to the Wi-Fi network, dynamically configuring consumer premises equipment (CPE) associated with the identified Wi-Fi network to support the QoS level for the session flow of the UE established by the UE on the cellular mobile network by sending, to the CPE, one or more CPE-specific commands including one or more UE-specific policy rules, causing the CPE to implement the UE-specific policy rules and support the QoS level for the session flow of the UE established by the UE on the cellular mobile network, wherein the CPE comprises a residential or business gateway configured to provide Internet service to devices within a user's residence or place of business by way of the Wi-Fi network; and
in response to the UE going out of range of the Wi-Fi network, receiving a second cell site change notification message indicating that the UE is no longer connected to the Wi-Fi network, and, in response, releasing resources in the residential gateway for the UE by sending, to the CPE, one or more additional CPE-specific commands to release resources previously used to accommodate the QoS level for the session flow of the UE established by the UE on the cellular mobile network.

2. The method of claim 1 wherein the cellular mobile network comprises a long term evolution (LTE) network.

3. The method of claim 1 wherein the mobility offload gateway comprises a standalone unit that is part of the policy infrastructure in a network.

4. The method of claim 3 wherein the mobility offload gateway is a component of a policy and charging rules function (PCRF).

5. The method of claim 1 wherein determining whether the UE can be offloaded includes determining whether the UE is in range of the Wi-Fi network.

6. The method of claim 1 wherein the CPE-specific commands comprise Broadband Forum (BBF) TR-69 commands.

7. A system for dynamic customer premises equipment configuration, the system comprising:
a mobility offload gateway comprising:
a network interface for receiving a cell site change notification message from a cellular mobile network, the cell site change notification message specifying that user equipment (UE) has relocated from the mobile cellular network;
an offload determination module for determining, based on the cell site change notification message, that the UE can be offloaded to a Wi-Fi network, including determining that the Wi-Fi network is configured for supporting a quality of service (QoS) level for a session flow of the UE established by the UE on the cellular mobile network; and
a dynamic customer premises equipment (CPE) configuration module for, in response to receiving the cell site change notification message and determining that the UE can be offloaded to the Wi-Fi network, dynamically configuring consumer premises equipment (CPE) associated with the identified Wi-Fi network to support the QoS level for the session flow of the UE established by the UE on the cellular mobile network by sending, to the CPE, one or more CPE-specific commands including one or more UE-specific policy rules, causing the CPE to implement the UE-specific policy rules and support the QoS level for the session flow of the UE established by the UE on the cellular mobile network, wherein the CPE comprises a residential or business gateway configured to provide Internet service to devices within a user's residence or place of business by way of the Wi-Fi network;

wherein the network interface is further configured to, in response to the UE going out of range of the Wi-Fi network, receive a second cell site change notification message indicating that the UE is no longer connected to the Wi-Fi network, and, in response, configured to release resources in the residential gateway for the UE by sending, to the CPE, one or more additional CPE-specific commands to release resources previously used to accommodate the QoS level for the session flow of the UE established by the UE on the cellular mobile network.

8. The system of claim 7 wherein the cellular mobile network comprises a long term evolution (LTE) network.

9. The system of claim 7 wherein the mobility offload gateway comprises a standalone unit that is part of the policy infrastructure in a network.

10. The system of claim 9 wherein the mobility offload gateway is a component of a policy and charging rules function (PCRF).

11. The system of claim 7 wherein the offload determination module is further configured to determine whether the UE is in range of the Wi-Fi network.

12. The system of claim 7 wherein the CPE-specific commands comprise Broadband Forum (BBF) TR-69 commands.

13. A non-transitory computer readable medium having stored thereon executable instructions that when executed by the processor of a computer control the computer to perform steps comprising:

at a mobility offload gateway:
receiving a cell site change notification message from a cellular mobile network, the cell site change notification message specifying that user equipment (UE) has relocated from the cellular mobile network;
determining, based on the cell site change notification message, that the UE can be offloaded to a Wi-Fi network, including determining that the Wi-Fi network is configured for supporting a quality of service (QoS) level for a session flow of the UE established by the UE on the cellular mobile network;
in response to receiving the cell site change notification message and determining that the UE can be offloaded to the Wi-Fi network, dynamically configuring consumer premises equipment (CPE) associated with the identified Wi-Fi network to support the QoS level for the session flow of the UE established by the UE on the mobile network by sending, to the CPE, one or more CPE-specific commands including one or more UE-specific policy rules, causing the CPE to implement the UE-specific policy rules and support the QoS level for the session flow of the UE established by the UE on the cellular mobile network, wherein the CPE comprises a residential or business gateway configured to provide Internet service to devices within a user's residence or place of business by way of the Wi-Fi network; and
in response to the UE going out of range of the Wi-Fi network, receiving a second cell site change notification message indicating that the UE is no longer connected to the Wi-Fi network, and, in response, releasing resources in the residential gateway for the UE by sending, to the CPE, one or more additional CPE-specific commands to release resources previously used to accommodate the QoS level for the session flow of the UE established by the UE on the cellular mobile network.

* * * * *